(12) United States Patent
Thöemmes et al.

(10) Patent No.: US 11,630,812 B2
(45) Date of Patent: Apr. 18, 2023

(54) SCHEMA BASED TYPE-COERCION FOR STRUCTURED DOCUMENTS

(71) Applicant: RED HAT, INC., Raleigh, NC (US)

(72) Inventors: Markus Thöemmes, Lückenburg (DE); Francesco Guardiani, Berlin (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/410,451

(22) Filed: Aug. 24, 2021

(65) Prior Publication Data

US 2023/0069124 A1    Mar. 2, 2023

(51) Int. Cl.
*G06F 16/21* (2019.01)
*G06F 16/2455* (2019.01)
*G06F 16/93* (2019.01)

(52) U.S. Cl.
CPC ........ *G06F 16/213* (2019.01); *G06F 16/2455* (2019.01); *G06F 16/93* (2019.01)

(58) Field of Classification Search
CPC ..... G06F 16/213; G06F 16/93; G06F 16/2455
See application file for complete search history.

(56) References Cited

U.S. PATENT DOCUMENTS

| | | | | |
|---|---|---|---|---|
| 9,286,297 | B1* | 3/2016 | Bugaj | G06Q 40/00 |
| 10,848,379 | B2 | 11/2020 | Sharma et al. | |
| 11,107,015 | B2* | 8/2021 | Chen | G06Q 10/06 |
| 11,314,807 | B2* | 4/2022 | Hershowitz | G06F 16/1794 |
| 2003/0078902 | A1* | 4/2003 | Leong | G06F 16/289 |
| | | | | 706/59 |
| 2005/0210375 | A1* | 9/2005 | Iwasaki | G06F 40/194 |
| | | | | 715/243 |
| 2009/0327870 | A1* | 12/2009 | Bar-Or | G06F 40/154 |
| | | | | 715/242 |
| 2010/0153837 | A1* | 6/2010 | Bellessort | G06F 40/149 |
| | | | | 706/12 |
| 2010/0250610 | A1* | 9/2010 | Kanawa | G06F 16/93 |
| | | | | 707/E17.044 |
| 2012/0005157 | A1* | 1/2012 | Forsberg | H04L 67/56 |
| | | | | 707/E17.127 |
| 2012/0226658 | A1* | 9/2012 | Connor | G06F 16/93 |
| | | | | 707/E17.005 |
| 2014/0280047 | A1* | 9/2014 | Shukla | G06F 16/24554 |
| | | | | 707/769 |
| 2019/0138610 | A1* | 5/2019 | Taleghani | G06F 40/103 |
| 2020/0228402 | A1 | 7/2020 | Parker | |

(Continued)

FOREIGN PATENT DOCUMENTS

CN    111736949 A    10/2020

OTHER PUBLICATIONS

Msv, J. (Sep. 10, 2020). "How Does Service Discovery Work in Kubernetes," Thenewstack, pp. 14.

(Continued)

*Primary Examiner* — Merilyn P Nguyen
(74) *Attorney, Agent, or Firm* — Womble Bond Dickinson (US) LLP

(57) ABSTRACT

A schema associated with a type of document is received. A set of documents are queried for documents that match the schema, wherein the query is performed while bypassing user intervention. A subset of documents of the set of documents is identified that match the schema. The subset of documents that match the schema are transmitted to a document controller.

20 Claims, 6 Drawing Sheets

(56) References Cited

U.S. PATENT DOCUMENTS

2022/0101153 A1* 3/2022 Hubauer ................ G06N 20/00
2022/0245155 A1* 8/2022 Dixon ............... G06F 16/24573
2022/0263772 A1* 8/2022 Thoemmes ............. G06F 9/541

OTHER PUBLICATIONS

Schimanski, S. (Jun. 20, 2019). "Future of CRDs: Structural Schemas," Kubernetes.io, pp. 5.
Feb. 11, 2021. "Extend the Kubernetes API with CustomResourceDefinitions," Kubernetes.io, pp. 20.
Nichols, S. (Feb. 3, 2021). "Proposal: Duck Types for Kubernetes," pp. 4.

* cited by examiner

SCHEMA BASED TYPE-COERCION FOR STRUCTURED DOCUMENTS

TECHNICAL FIELD

Aspects of the present disclosure relate to container-orchestration systems, and more particularly, to utilizing schema based type-coercion for structured documents.

BACKGROUND

A container-orchestration system may automate many of the manual processes involved in deploying, managing, and scaling containerized applications. For example, a container-orchestration system for developing and running containerized applications may allow applications and the data centers that support them to expand from just a few machines and applications to thousands of machines that serve millions of clients. Container-orchestration systems may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database. These services may be connected to various resources and managed by a system operator.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
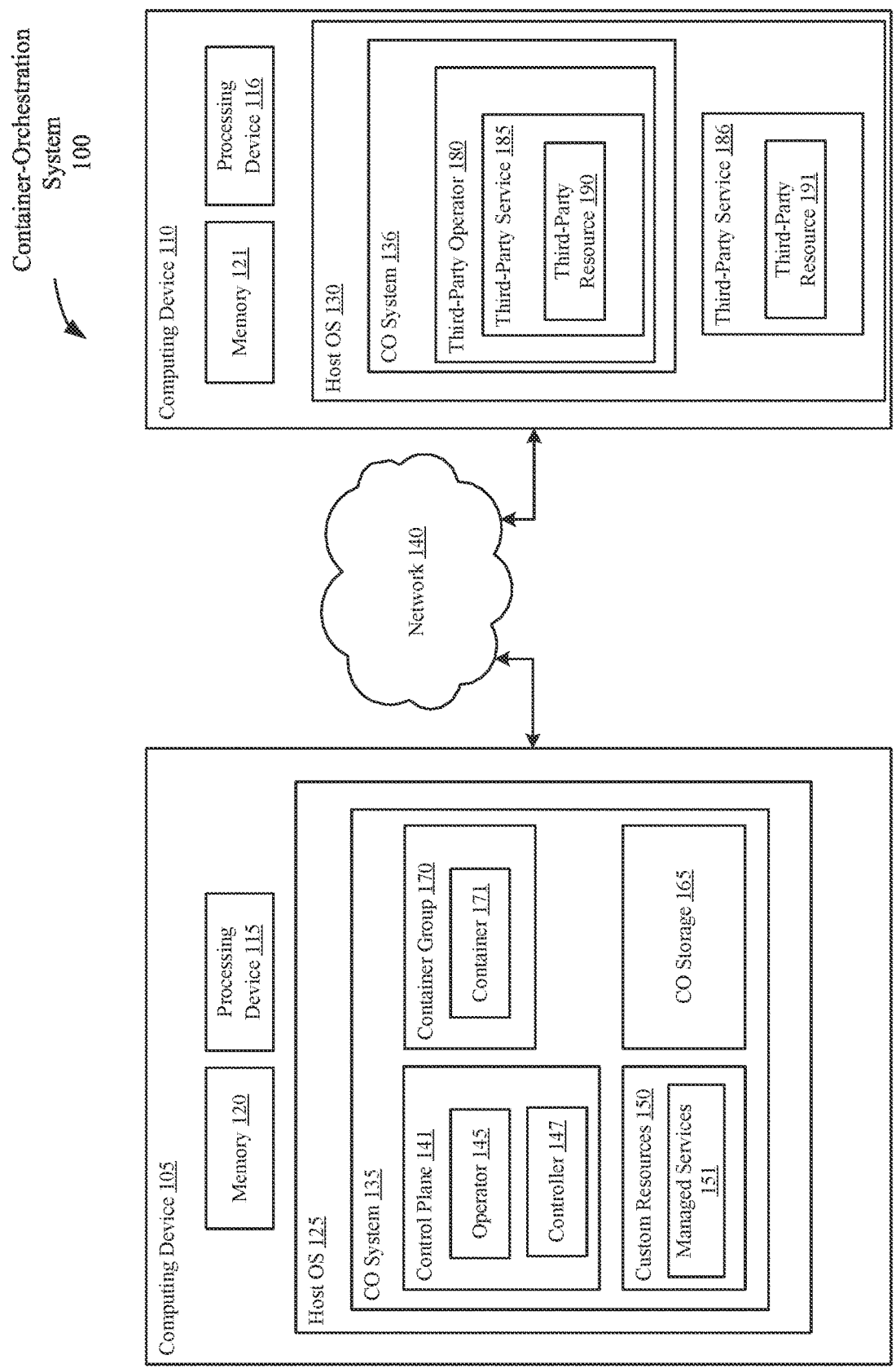
FIG. 1 depicts a high-level component diagram of an illustrative example of a container-orchestration system, in accordance with one or more aspects of the present disclosure.

Custom services, such as a containerized application for example, are deployed within a node or group of nodes (hereinafter, "cluster") of a container-orchestration system (e.g., Redhat™ OpenShift™ module on a Kubernetes® platform) may depend on other services and their respective resources deployed within and outside the group. For example, a web service may persist its data into a resource, such as a database. The services may be deployed and connected to other services and resources by a cluster's system operator through a dependency configuration and monitored by one or more controllers. Some of these services and resources may be local to the operator, meaning already managed by the operator deploying the service, or may not be local and is a third-party resource (also referred to as a "custom resource" hereafter) managed by another operator. Some of these third-party resources may correspond to plugin extensions that add additional functionality to a service that may not be provided by resources that are local to the operator. Operators may manage these third-party resources by defining custom resource definitions that describe the custom resources.

In a conventional container-orchestration system, the local resources may include defined schemas that are used to verify the corresponding local resources by providing the structure along with the fields defined for the local resources. In some instances, the custom resources may perform similar operations to local resources. For example, a local resource may include an application programming interface (API) to instantiate a container image, while a custom resource may augment the API to instantiate the container image to instantiate multiple container images. Despite there being common logic between the local resource and the custom resource, however, in a conventional container-orchestration system a user may not be able to utilize the common logic between a local resource and a custom resource. Using the previous example, a user may not be able to use the common logic of instantiating a container image between the local resource of instantiating a single container image and the custom resource, which also instantiates a container image, but performs this operation multiple times. In a conventional container-orchestration system, the user may have to manually program all of the logic for the custom resource, a process that is tedious, time consuming, and fraught with errors.

Aspects of the disclosure address the above-noted and other deficiencies by utilizing schema based type-coercion for structured documents. In embodiments, processing logic of a processing device of a container-orchestration system may execute a type coercion controller. The type coercion controller may receive a schema that is associated with a type of document, such as custom resource definitions. Upon receiving the schema, the type coercion controller may query the available documents of the nodes of the cluster to determine which of the documents match the structure defined by the schema. For example, the type coercion controller may query the custom resource definitions of a container-orchestration system to determine which of the custom resource definitions match the structure defined by the schema. In some embodiments, the type coercion controller may perform a duck typing operation to determine which of the documents match the structure defined by the schema. A duck typing operation may determine an object's suitability by the presence of certain methods and/or properties, rather than the type of the object itself. The type coercion controller may dynamically perform the query of the documents automatically (e.g., without user intervention) whenever a new schema is received, an existing schema is modified, or one of the documents is modified.

The type coercion controller may identify a subset of documents that match the schema and provide the subset of documents to a document controller. The document controller may then monitor and reconcile the subset of documents that were provided by the type coercion controller. For example, the document controller many monitor and reconcile a subset of custom resource definitions provided by the type coercion controller and/or the underlying custom resources associated with the set of custom resource definitions.

By utilizing schema based type-coercion for structured documents in a container-orchestration system, common logic may be implemented between different structured documents, such as resources of the container-orchestration system, without a user having to manually program the common logic. By having a type coercion controller automatically and dynamically query the available documents, such as custom resource definitions, that match the structure defined by a schema, matching documents can be identified even when new documents are being added or existing documents are being modified, improving the performance of the container-orchestration system.

FIG. 1 depicts a high-level component diagram of an illustrative example of a container-orchestration system 100, in accordance with one or more aspects of the present disclosure. One skilled in the art will appreciate that other architectures for a container-orchestration system 100 are possible, and that the implementation of a computer system utilizing examples of the invention are not necessarily limited to the specific architecture depicted by FIG. 1.

FIG. 1 is a block diagram that illustrates an example of a container-orchestration system 100, in accordance with one or more aspects of the present disclosure. The container-orchestration system 100 may include a computing device 105 and computing device 110. For simplicity, only two computing devices are illustrated, however, there may be more or less implemented in other embodiments of the container-orchestration system 100. The computing devices 105, and 110 may be coupled to each other (e.g., may be operatively coupled, communicatively coupled, may communicate data/messages with each other) over network 140. Network 140 may be a public network (e.g., the internet), a private network (e.g., a local area network (LAN) or wide area network (WAN)), or a combination thereof. In various embodiments, the network 140 may include a wired or a wireless infrastructure, such as a WiFi™ hotspot connected with the network 140, and/or a wireless carrier system that can be implemented using various data processing equipment, communication towers (e.g. cell towers), etc. In embodiments, the network 140 may utilize any protocol or combination of protocols for communicating between the computing devices 105 and 110, such as Ethernet, internet protocol (IP), etc.

Each computing device 105 and 110 may include hardware such as processing device 115 and 116, memory 120 and 121, respectively, and other hardware devices (e.g., sound card, video card, etc.) (not shown). In an illustrative example, processing device 115 or processing device 116 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 115 or processing device 116 may also include one or more special-purpose processing devices such as an application specific integrated circuit (ASIC), a field programmable gate array (FPGA), a digital signal processor (DSP), network processor, or the like.

Each computing device 105 and 110 may include any suitable type of computing device or machine that has one or more processing devices (e.g., processing device 115) including, for example, server computers, desktop computers, laptop computers, tablet computers, smartphones, set-top boxes, etc. In some examples, each of the computing devices 105, and 110 may comprise a single machine, virtual machines running on one or more machines, or may include multiple interconnected real or virtual machines (e.g., multiple nodes in a cluster). The computing devices 105 and 110 may be implemented by a common entity or may be implemented by different entities. For example, computing device 105 may be operated by a first entity and one or more computing device 110 may be operated by a second entity.

In one embodiment, the computing devices 105 and 110 include an operating system (OS), such as host OS 125 and host OS 130, respectively. The host OS 125 and 130 of a computing device 105 and 110 may manage the execution of other components (e.g., software, applications, etc.) and may manage access to hardware (e.g., processors, memory, storage devices etc.) of its respective computing device. In embodiments, computing device 105 may implement a container-orchestration system 135 (CO system 135) that includes a control plane 141, custom resources 150, container-orchestration storage 165 (CO storage 165) and a container group 170. Computing device 110 may implement a container-orchestration system 136 (CO system 136) that is connected to and in communication with CO system 135 of computing device 105, such as through the network 140. In embodiments, CO system 136 may be logically or functionally the same container-orchestration system as CO system 135, have a client relationship with CO system 135, or a self-contained container-orchestration system and able to communicate and interoperate with CO system 135.

CO system 136 may include a third-party operator 180 and a third-party service 185 that is connected to third-party resource 190. In embodiments, the third-party resource 190 may be on computing device 110 or located on another computing device (not shown) either locally or remotely through the network 140. The host OS 130 may also include a third-party service 186 and its third-party resource 191 managed by an external third-party operator (not shown) that are not operating within the CO system 136, but are still accessible by the CO system 135 and CO system 136.

In one embodiment, the CO system 135 and executes on the host OS 125 of computing device 105 and the host OS 130 of computing device 110, respectively. The CO system 135 may be a system for developing, deploying and running containerized applications that, for example, may include or be in communication with services and resources. For example, a service may utilize connections to one or more resources, such as a database, a message broker, or another piece of infrastructure within the CO system 135, CO system 136, computing device 110, or another computing device (not shown) within, or in communication with, the container-orchestration system 100.

The CO system 135 may include one or more basic compute-units such as container group 170 that runs on a node (e.g., CO system 135 on computing device 105). A node may be a virtual or physical machine, depending on the cluster, as discussed above. Each node is managed by a control plane, such as the control plane 141, and contains the services necessary to run a container group, such as container group 170. The container group 170 may include, for example, one or more containers, such as container 171, which may be deployed on a single host. Each container may include, for example, applications, which consist of application code and everything the code requires to run properly. The container 171 is defined, deployed, and managed by the CO system 135, and specifically, in an embodiment, by the operator 145.

Custom services, such as an application running within container 171, may depend on other services deployed within CO system 135 or CO system 136. For example, a web service (application) may be required to persist its data into a database resource. To connect to a third-party resource, in an embodiment, the operator 145 may use one or more custom resources of custom resources 150 to retrieve specification data of a dependency definition (not shown) associated with the third-party service 185 and its third-party resource 190 from storage, such as CO storage 165. The operator 145 may create, if new, or update dependency definition associated with the custom resources 150 to describe, for example, the third-party resource 190 of the third-party service 185 that a managed service from managed services (not shown) associated with the container 171 uses to properly execute. As a result, the dependency definition can be changed to reflect changes to the third-party service and resource (e.g., third-party service 185 and third-party resource 190 or third-party service 186 and third-party resource 191) without manual intervention, such as user constructed scripts, to reconfigure the managed service.

The control plane 141 may further include one or more controllers 147. The one or more controllers 147 may monitor objects, such as documents or custom resource definitions, of the container-orchestration system 100 for changes to the objects. For example, the one or more controllers 147 may monitor the objects for any modifications, replication, namespace changes, deletions, etc. The one or more controllers 147 may utilize an application programming interface (API) to enforce a specified state (also referred to as "reconciling" hereafter) associated with the objects that are being monitored by the one or more controllers 147.

Figure 2:
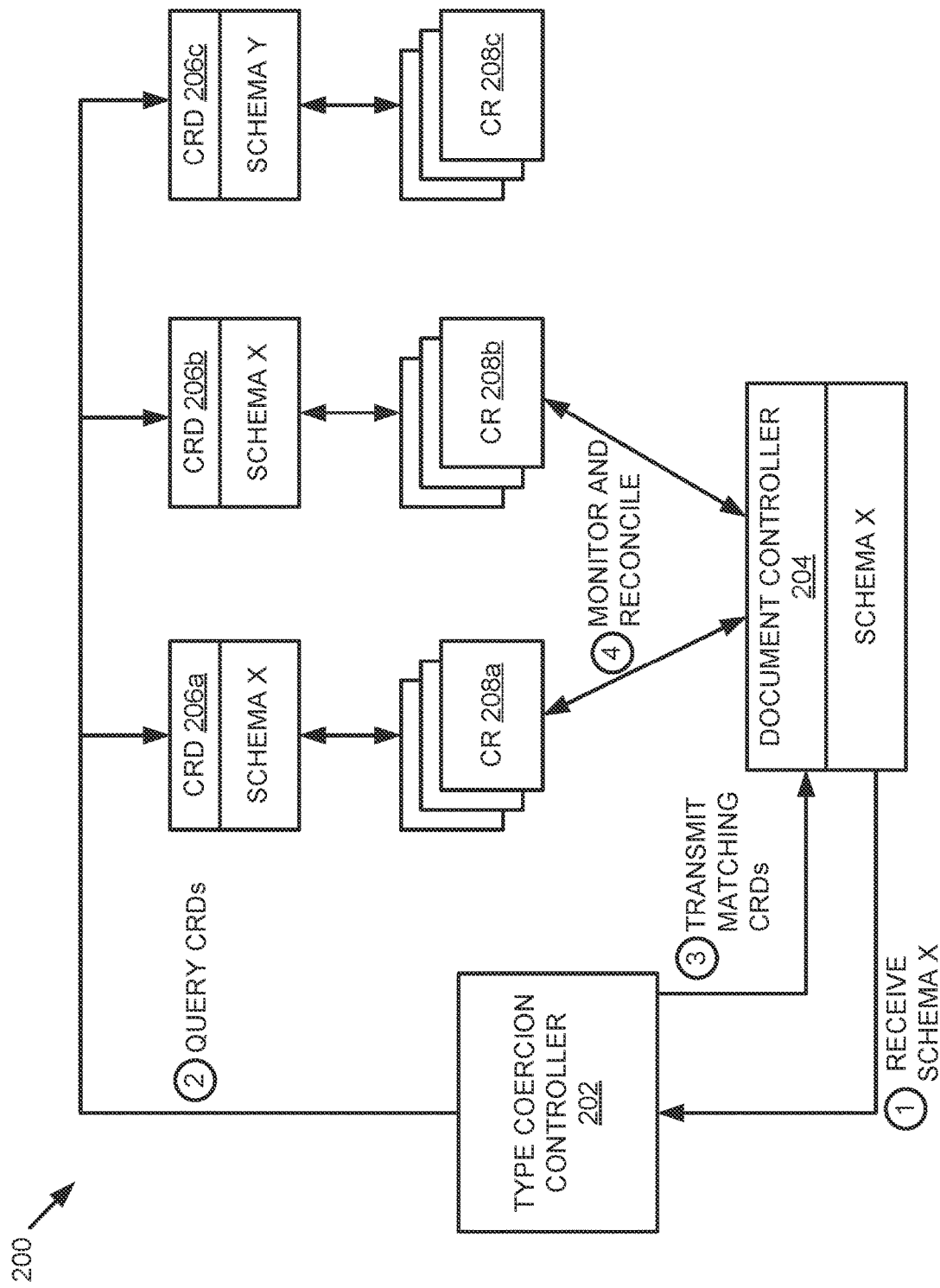
FIG. 2 is a component diagram of an example of a container-orchestration system, in accordance with embodiments of the disclosure.

FIG. 2 is a component diagram of an example of a container-orchestration system 200, in accordance with embodiments of the disclosure. The container-orchestration system 200 may correspond to container-orchestration system 100 of FIG. 1. The container-orchestration system 200 may include a type coercion controller 202, a document controller 204, custom resource definitions (CRDs) 206a-c, and custom resources (CRs) 208a-c. It should be noted that although FIG. 2 is described in the context of CRDs and CRs, embodiments of the disclosure may be applied to any type of structured documents.

Type coercion controller 202 and document controller 204 may each correspond to controller 147 of FIG. 1. In embodiments, a user of container-orchestration system 200 may implement document controller 204 and define a schema for a type of document (e.g., schema X) as part of the document controller 204. As previously described, schemas may be used by a controller to verify the objects, such as CRD 206a-c and CR 208a-c, by providing the structure along with the fields defined for the objects. Upon implementing the document controller 204 and defining schema X, the document controller may provide schema X to the type coercion controller 202.

Upon receiving the schema from the document controller 204, the type coercion controller 202 may query each of the CRDs 206a-c of the container-orchestration system 200 to determine which of the CRDs 206a-c match the schema provided by the document controller 204. For each of CRDs 206a-c, the type coercion controller may obtain the corresponding schema for each of CRDs 206a-c and check if any child nodes of the CRD match the schema. If a child node matches the schema, the matching schemas may be appended to include a path to reach the parent node. In some embodiments, the type coercion controller 202 may determine which of CRDs 206a-c match the schema provided by document controller 204 by performing a duck typing operation. As previously described, a duck typing operation may determine an object's suitability by the presence of certain methods and/or properties, rather than the type of the object itself. For example, as part of a duck typing operation, the type coercion controller 202 may examine CRDs 206a-c to determine whether the properties of CRDs 206a-c match the structure of schema X provided by document controller 204.

The querying of CRDs 206a-c may be performed automatically (e.g., without user intervention) by the type coercion controller 202. Furthermore, the type coercion controller 202 may automatically perform the querying of CRDs 206a-c whenever a new schema is received, an existing schema is modified, there is a modification to one of CRDs 206a-c, or an addition of a new CRD.

Referring to FIG. 2, the type coercion controller 202 may query CRDs 206a-c and identify CRD 206a and CRD 206b as matching schema X, while CRD 206c does not match schema X. Upon identifying CRD 206a and CRD 206b as matching schema X, the type coercion controller 202 may transmit identification information associated with the matching CRDs to the document controller 204. Upon receiving the identification information for CRD 206a and CRD 206b, the document controller 204 may begin monitoring CRD 206a and/or the underlying CRs 208a of CRD 206a, as well as CRD 206b and/or the underlying CRs 208b of CRD 206b. The document controller 204 may then reconcile CRD 206a, CRs 208a, CRD 206b, and/or CRs 208b by utilizing an API to enforce a specified state associated with the CRDs 206a-b and/or CRs 208a-b.

Figure 3:
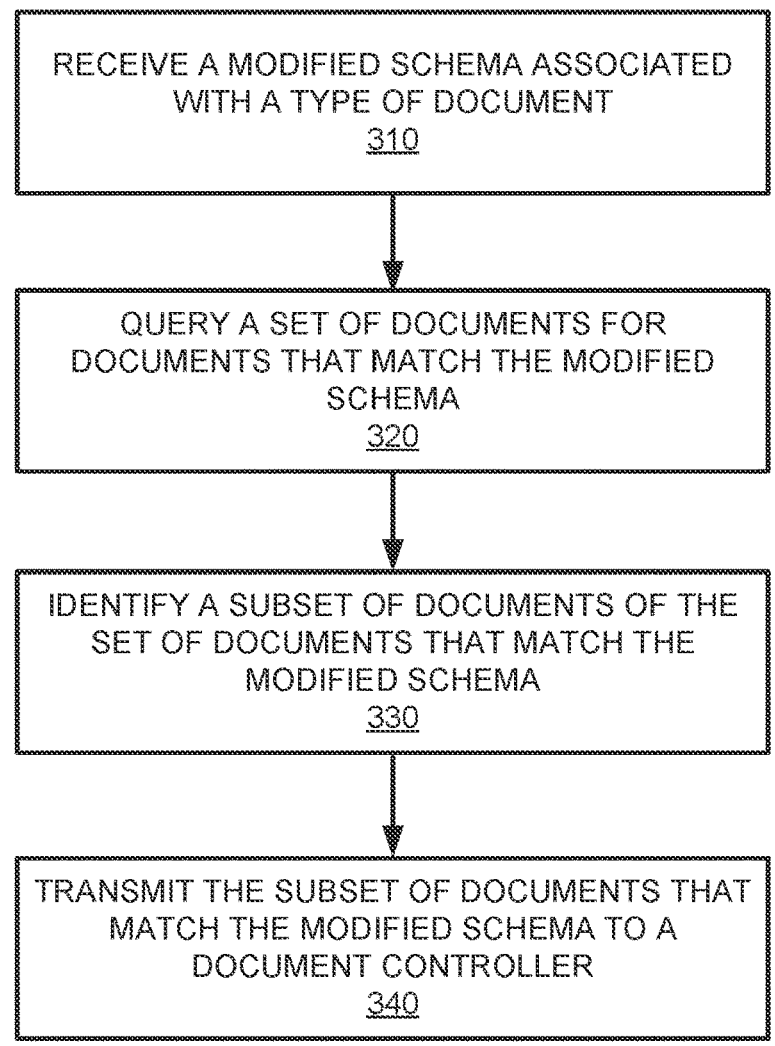
FIG. 3 is a flow diagram of a method of identifying a set of documents that match a modified schema, in accordance with some embodiments.

FIG. 3 is a flow diagram of a method 300 of identifying a set of documents that match a modified schema, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by type coercion controller 202 of FIG. 2.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a modified schema associated with a type of document. In embodiments, a user of a container-orchestration system may modify a schema, such as schema X of FIG. 2. For example, a user may modify the defined structure of the schema to generate a modified schema that is subsequently transmitted to the processing logic.

At block 320, the processing logic queries a set of documents to determine which documents match the modified schema, as previously described.

At block 330, the processing logic identifies a subset of documents of the set of documents that match the modified schema.

At block 340, the processing logic transmits the subset of documents that match the modified schema to a document controller.

Figure 4:
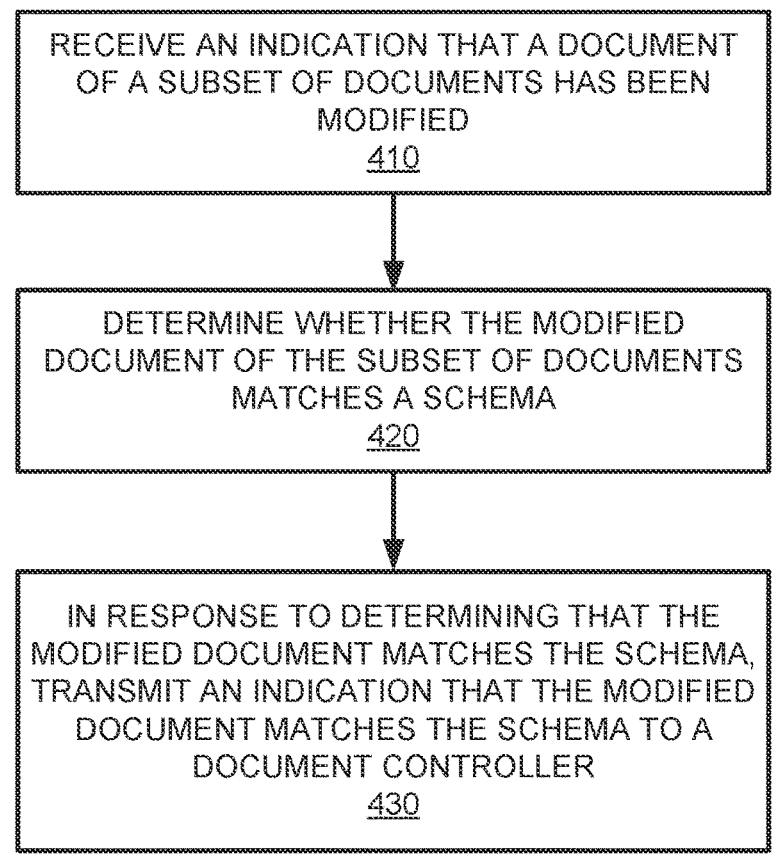
FIG. 4 is a flow diagram of a method of determining whether a modified document matches a schema, in accordance with some embodiments.

FIG. 4 is a flow diagram of a method 400 of determining whether a modified document matches a schema, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by type coercion controller 202 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 beings at block 410, where the processing logic receives an indication that a document of a subset of documents has been modified. For example, the processing logic may receive an indication that a custom resource definition (e.g., CRD 206a-c of FIG. 2) of a container-orchestration system has been modified.

At block 420, the processing logic determines whether the modified document of the subset of documents matches a schema. For example, the processing logic may determine whether the modified documents matches a schema provided by a document controller.

At block 430, in response to determining that the modified document matches the schema, the processing logic transmits an indication that the modified document matches the schema to a document controller. For example, the processing logic may transmit the indication to the document controller that provided the schema.

Figure 5:
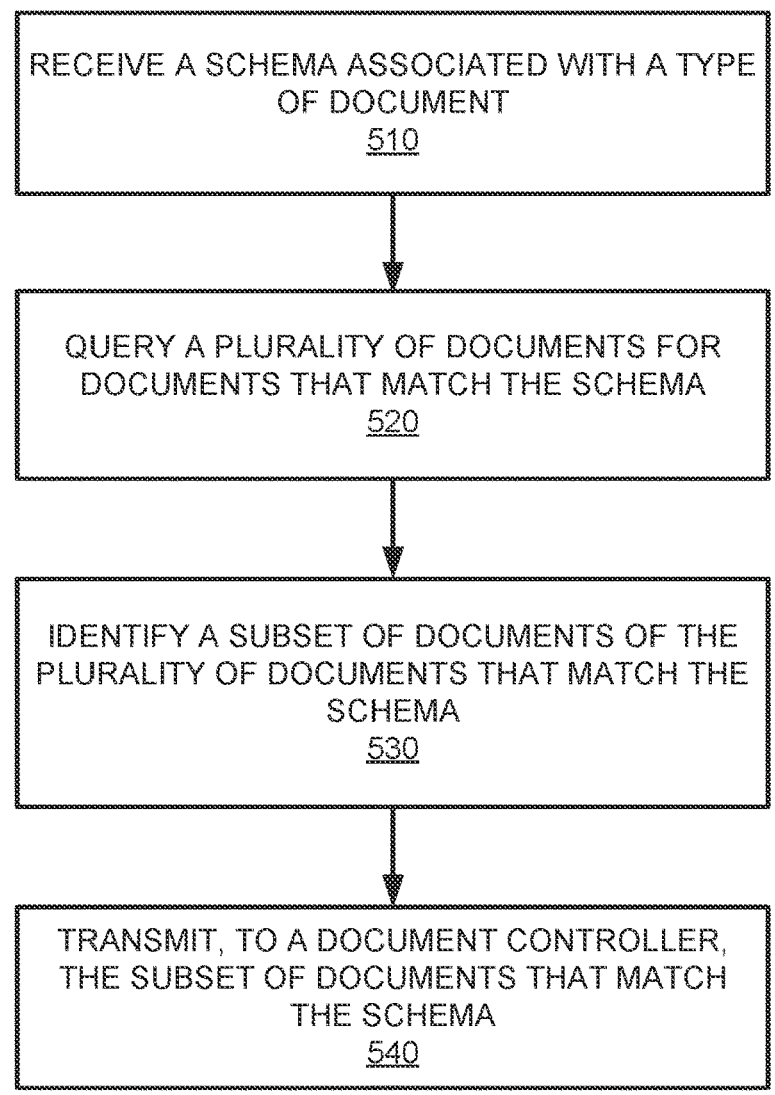
FIG. 5 is a flow diagram of a method of utilizing schema based type-coercion for structured documents, in accordance with some embodiments.

FIG. 5 is a flow diagram of a method 500 of utilizing schema based type-coercion for structured documents, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by type coercion controller 202 of FIG. 2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a schema associated with a type of document.

At block 520, the processing logic queries a plurality of documents for documents that match the schema. As previously described, the processing logic may query the plurality of documents automatically, without user intervention.

At block 530, the processing logic identifies a subset of documents of the plurality of documents that match the schema.

At block 540, the processing logic transmits, to a document controller, the subset of documents that match the schema.

Figure 6:
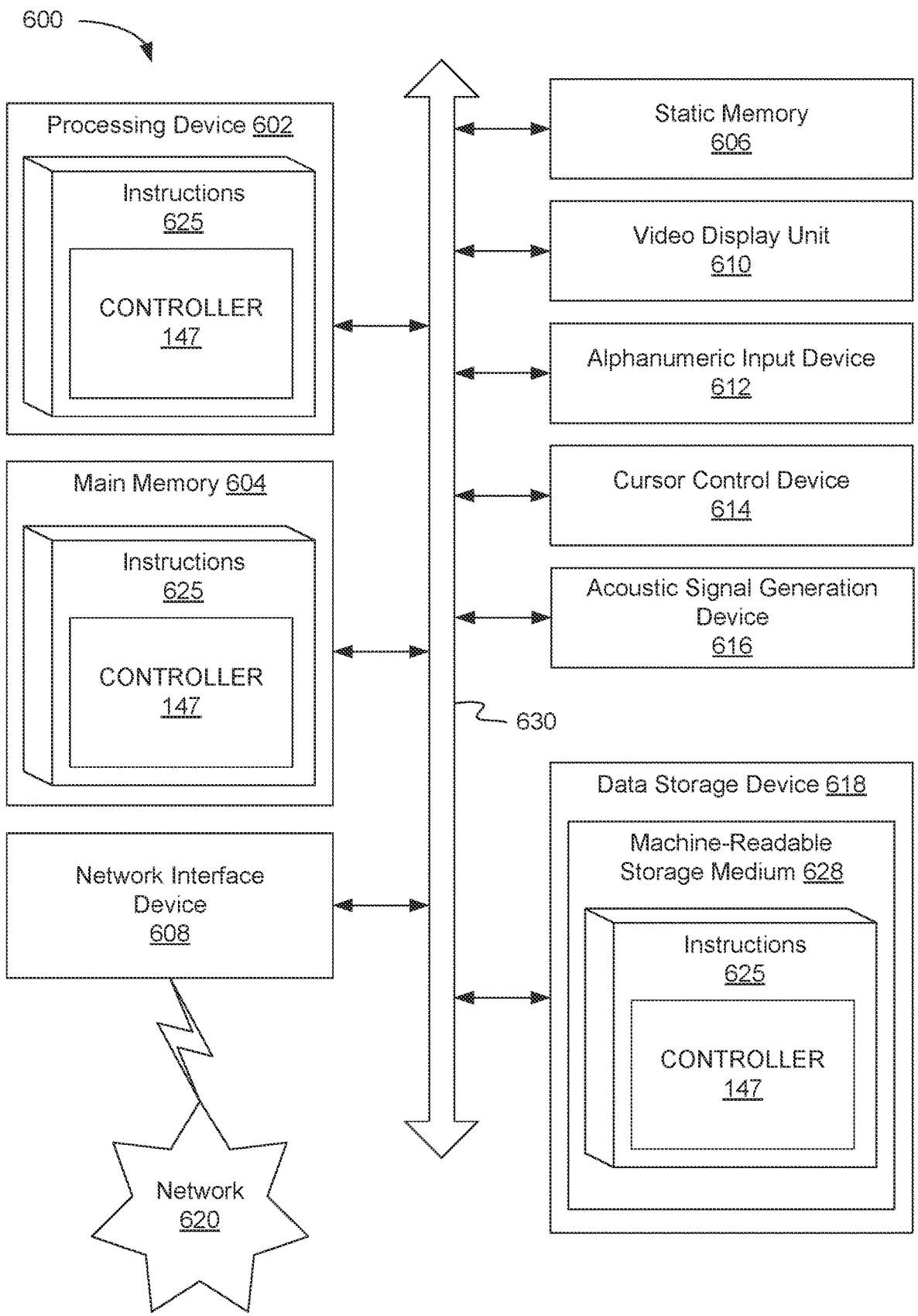
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a controller, e.g., controller 147 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "transmitting," "querying," "identifying," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for resource management by a type coercion controller, the method comprising:
   receiving, at the type coercion controller, a schema associated with a type of document;

automatically querying, by a processing device of the type coercion controller, a plurality of documents for documents that match the schema, wherein the query is performed while bypassing user intervention and wherein the plurality of documents comprises different structured documents;

identifying, by the type coercion controller, a subset of documents of the automatically queried plurality of documents, the subset of documents matching the schema; and transmitting, from the type coercion controller to a document controller, the subset of documents that match the schema.

2. The method of claim 1, wherein the plurality of documents comprises custom resource definitions.

3. The method of claim 1, wherein transmitting the subset of documents that match the schema causes the document controller to monitor the subset of the documents.

4. The method of claim 1, wherein the schema is received from the document controller.

5. The method of claim 1, further comprising:

receiving a modified schema associated with the type of document;

querying the plurality of documents for documents that match the modified schema;

identifying a second subset of documents of the plurality of documents that match the modified schema; and transmitting, to the document controller, the second subset of documents that match the modified schema.

6. The method of claim 1, further comprising:

receiving an indication that a document of the subset of documents has been modified;

determining whether the modified document of the subset of documents matches the schema; and in response to determining that the modified document matches the schema, transmitting, to the document controller, an indication that the modified document matches the schema.

7. The method of claim 1, wherein querying the plurality of documents for documents that match the schema comprises performing a duck typing operation.

8. A system comprising:

a memory; and a processing device of a type coercion controller, operatively coupled to the memory, to:

receive, at the type coercion controller, a schema associated with a type of document;

automatically query a plurality of documents for documents that match the schema wherein the query is performed while bypassing user intervention and wherein the plurality of documents comprises different structured documents;

identify, by the type coercion controller, a subset of documents of the automatically queried plurality of documents, the subset of documents matching the schema; and transmit, from the type coercion controller to a document controller, the subset of documents that match the schema.

9. The system of claim 8, wherein the plurality of documents comprises custom resource definitions.

10. The system of claim 8, wherein transmitting the subset of documents that match the schema causes the document controller to monitor the subset of the documents.

11. The system of claim 8, wherein the schema is received from the document controller.

12. The system of claim 8, wherein the processing device is further to:

receive a modified schema associated with the type of document;

query the plurality of documents for documents that match the modified schema;

identify a second subset of documents of the plurality of documents that match the modified schema; and transmit, to the document controller, the second subset of documents that match the modified schema.

13. The system of claim 8, wherein the processing device is further to:

receive an indication that a document of the subset of documents has been modified;

determine whether the modified document of the subset of documents matches the schema; and in response to determining that the modified document matches the schema, transmit, to the document controller, an indication that the modified document matches the schema.

14. The system of claim 8, wherein querying the plurality of documents for documents that match the schema comprises performing a duck typing operation.

15. A non-transitory computer-readable storage medium including instructions that, when executed by a processing device, cause the processing device to:

receive, at a type coercion controller, a schema associated with a type of document;

automatically query, by the processing device of the type coercion controller, a plurality of documents for documents that match the schema wherein the query is performed while bypassing user intervention and wherein the plurality of documents comprises different structured documents;

identify, by the type coercion controller, a subset of documents of the automatically queried plurality of documents, the subset of documents matching the schema;

and transmit, from the type coercion controller to a document controller, the subset of documents that match the schema.

16. The non-transitory computer-readable storage medium of claim 15, wherein the plurality of documents comprises custom resource definitions.

17. The non-transitory computer-readable storage medium of claim 15, wherein transmitting the subset of documents that match the schema causes the document controller to monitor the subset of the documents.

18. The non-transitory computer-readable storage medium of claim 15, wherein the schema is received from the document controller.

19. The non-transitory computer-readable storage medium of claim 15, wherein the processing device is further to:

receive a modified schema associated with the type of document;

query the plurality of documents for documents that match the modified schema;

identify a second subset of documents of the plurality of documents that match the modified schema; and transmit, to the document controller, the second subset of documents that match the modified schema.

20. The non-transitory computer-readable storage medium of claim 15, wherein the processing device is further to:

receive an indication that a document of the subset of documents has been modified;

determine whether the modified document of the subset of documents matches the schema; and in response to determining that the modified document matches the schema, transmit, to the document controller, an indication that the modified document matches the schema.

\* \* \* \* \*